United States Patent [19]
Wittmaier et al.

[11] Patent Number: 5,447,086
[45] Date of Patent: Sep. 5, 1995

[54] BLADE SUPPORT

[75] Inventors: Klaus Wittmaier, Vaihingen/Enz;
Peter Bäzner, Illingen-Schützingen;
Horst Kostewa, Vaihingen/Enz, all of Germany

[73] Assignee: Schober GmbH Werkzeug-und Maschinenbau,
Eberdingen/Hochdorf, Germany

[21] Appl. No.: 59,331

[22] Filed: May 11, 1993

[30] Foreign Application Priority Data

May 13, 1992 [DE] Germany .................. 42 15 736.6
Dec. 12, 1992 [DE] Germany .................. 42 41 957.3

[51] Int. Cl.[6] .......................................... B26D 1/14
[52] U.S. Cl. .......................................... 83/666; 83/676; 83/698.41
[58] Field of Search ............... 83/666, 676, 698, 481, 83/698.61, 698.51, 698.41

[56] References Cited
U.S. PATENT DOCUMENTS

| | | | |
|---|---|---|---|
| 3,831,482 | 8/1974 | Eichler et al. | 83/698 X |
| 3,905,264 | 9/1975 | Eddy | 83/481 |
| 3,908,499 | 9/1975 | Reed | 83/481 |
| 4,497,141 | 2/1985 | Jarby | 83/666 |
| 4,572,047 | 2/1986 | Punator et al. | 83/676 X |
| 4,706,386 | 11/1987 | Wiley | 83/666 X |
| 4,909,113 | 3/1990 | Ischenko et al. | 83/666 X |
| 5,161,334 | 11/1992 | Schaal et al. | 83/698.41 |

FOREIGN PATENT DOCUMENTS 512052 12/1974 U.S.S.R. ............... 83/666

Primary Examiner—Kenneth E. Peterson
Attorney, Agent, or Firm—Jones, Tullar & Cooper

[57] ABSTRACT

In a blade support, particularly for circular blades, having a positioning arm and a blade support device rotatably fixed to it for the blade, access to the blade is made simpler by providing the blade support device with a mandrel reaching through the blade and having a bearing flange for the blade, and with a quick-action lock.

8 Claims, 7 Drawing Sheets

BLADE SUPPORT

FIELD OF THE INVENTION

The invention relates to a blade support, particularly for circular blades, having a positioning arm and a blade support device, particularly one fixed rotatably, for the blade.

BACKGROUND OF THE INVENTION

Many kinds of such blade supports are known. As a rule, they are used to trim the side edges of endless webs of paper, but they are also used to cut longitudinal perforations into the webs. To do so, the blade supports are clamped to a fastening bar and via the positioning arm, they press with their blade against the endless web, which is guided via a rotating cylinder. Since the blade wears down as the webs are trimmed or perforated, it is interchangeably secured to the blade support device. It has proved to be disadvantageous that the blade can be released from the blade support device only with the aid of a tool. On the one hand, this is inconvenient; on the other, it often cannot be done when there are more than one blade support located close together, because the tool cannot be moved to the blade support device. Moreover, the known blade supports are relatively wide, making the distance between individual perforations or cuts relatively great as well; conversely, with the known blade supports, closely spaced cuts or perforations can be made only if the blade supports are disposed in line with one another rather than side by side. That then requires more than one rotating cylinder, via which the webs to be handled are guided.

Blade supports are known from German Utility Models DE-GM 84 27 036 and DE-GM 91 05 289 and from German Patent Disclosure DE 30 42 472 A1. In the blade support of DE-GM 91 05 289, the blade is supported by a catch element of a quick-action lock, the catch element being supported on a bearing. For play-free support of the blade, the catch element must be adapted to the dimensions of the cutting blade, and the bearing must be adapted to the dimensions of the catch element; this is not only labor- and cost-intensive but often causes malfunctions when the components seize.

OBJECT AND SUMMARY OF THE INVENTION

It is therefore the object of the invention to embody a blade support of the type described at the outset such that it is sturdy, slender, and simpler to operate.

This object is attained in accordance with the invention in that the blade support device has a mandrel fitting through the blade and centering it, with a bearing flange for the blade and a quick-action lock.

Embodying the blade support or blade support device according to the invention with a quick-action lock means that the worn blade can be replaced by a new one in minimal time, and no tool whatever is required to do so. Simply inserting the blade into the blade support device is achieved by slipping it onto the mandrel far enough that the blade rests on the bearing flange. In the process, the blade assumes a defined position.

For securing the blade on the blade support device, the mandrel has elements that engage the blade from behind and secure it against lifting from the bearing flange; these elements in particular are radially displaceable. Via these elements, the blade is secured after being slipped onto the mandrel. This assures that even webs with irregular surfaces can be cut or perforated exactly, without changing the position of the blade on the blade support device and without the blade coming loose from the blade support device.

Preferably, the elements are embodied as pins, claws or segments of the mandrel. In the case of elements embodied as pins, they are radially extensible from the mandrel and engage the blade from behind so that the blade can no longer come loose from the bearing flange.

In a further feature, it is provided that the mandrel has a central recess that is surrounded by elements engaging the blade from behind, and an adjusting device is provided for the elements in the recess. By means of this adjusting device, the elements engaging the blade from behind are moved from a position of repose to a working position; in the position of repose, they release the blade, and in the working position they secure the blade on the bearing flange. The recess is preferably embodied as an opening.

In a preferred exemplary embodiment, the adjusting device is embodied as a shaft of polygonal cross section that is rotatably supported in the recess. Advantageously, each corner of the polygon is assigned to one element, particularly one radially displaceably supported pin. An adjusting device embodied in this way has the advantage on the one hand that it can be manufactured relatively simply, and on the other that shifting of the elements to secure the blade can be done relatively easily. If the corner of the polygon contacts a pin, for instance, then this pin is shifted partway out of the mandrel and secures the blade on the receiving flange. If the pin rests on the shaft in the region between two corners, then by spring force, for instance, it is thrust far enough into the mandrel that it releases the blade.

Additional support of the blade is attained by providing the bearing flange with a permanent magnet for retaining the blade on the bearing flange. This has the advantage that when a blade is changed, the new blade is already held with a certain force on the bearing flange without having the shift the pins into their working position to achieve this. In this embodiment, the pins then serve merely as securing pins.

In order to enable making relatively spaced cuts, provision is made in one exemplary embodiment for the mandrel to protrude beyond the blade by a segment that corresponds substantially to the thickness of the elements. Preferably, the segment protrudes beyond the blade by 3 mm to 8 mm, and in particular by 4 mm. Accordingly, if two blade holders are installed together, a cutting spacing of 6 mm to 16 mm, and in particular 8 mm to 10 mm, between the two blades can thus be attained. In this way, closely spaced perforations or longitudinal cuts are attainable.

A further advantage of the blade holder of the invention is that the total width of the blade holder device is 30 mm to 50 mm, and in particular 39 mm. Because this total width is so slight, very narrow lines of cutting or perforation in webs of material can be made.

Simple and fast blade changing is facilitated by providing that the quick-action lock is actuatable without a tool.

According to the invention, the quick-action lock has a flexible bed for blades of various thickness. This has the advantage that upon blade changing, blades whose thickness differs from that of the previous blade can also be used. This makes it advantageously easier to keep blades in stock, and there is no need to have different blade support devices for blades of different thicknesses.

The bed is preferably formed by a plurality of resiliently supported balls. With thicker blades, the balls defect inward, while with thinner blades the balls emerge from their spring supports, so that the blades are held securely and without play in this way.

In a preferable exemplary embodiment, the quick-action lock of the blade support device is embodied as a bayonet mount. A bayonet mount has the advantage of relatively simple mechanics and is relatively easy to operate. The bayonet mount is preferably formed by a bayonet plate that presses against a bed and is engaged from behind by bayonet pins of the blade support shaft. To change the blade, this bayonet plate need merely be rotated slightly relative to the blade support device shaft and can then be removed from the shaft. The blade can then be exchanged for a new one, which is firmly held once the bayonet plate is in place; the plate merely has to be rotated slightly relative to the blade support device shaft. It will be appreciated that this makes changing a blade simple and that blade changing can be done quickly without the aid of tools.

In another embodiment, the quick-action lock of the blade support device is embodied as a clawed clamping unit, which has claws that can be retracted and extended and that press the blade against a bed of the blade support device. The clawed clamping unit has the advantage that a blade change can again be done without tools, and that no component needs to be removed from the blade support when the blade is changed. That is, the blade support is not dismantled upon a blade change.

In a further feature, it is provided that the clawed clamping unit has a coaxial tappet that is spring-loaded in the axial direction; that the tappet has a grip head; and that the grip head has claws, protruding beyond its outer circumference, that fix the blade in a bed of the blade support device via the force of the spring-loaded tappet. The tappet is also axially displaceable, causing the claws to be retracted inside the outer circumference of the grip head. Thus all that is required for a blade change is that the tappet be moved in the axial direction and that the spring force of the tension spring be overcome. In the process, the claws that press the blade against the bed of the blade support device are retracted. The blade can then be removed via the grip head of the clawed clamping unit and exchanged for a new blade.

Further advantages, characteristics and details of the invention will become apparent in the ensuing description, in which particularly preferred exemplary embodiments are described in detail, in conjunction with the drawing.

DESCRIPTION OF THE PREFERRED EMBODIMENTS

Figure 1:
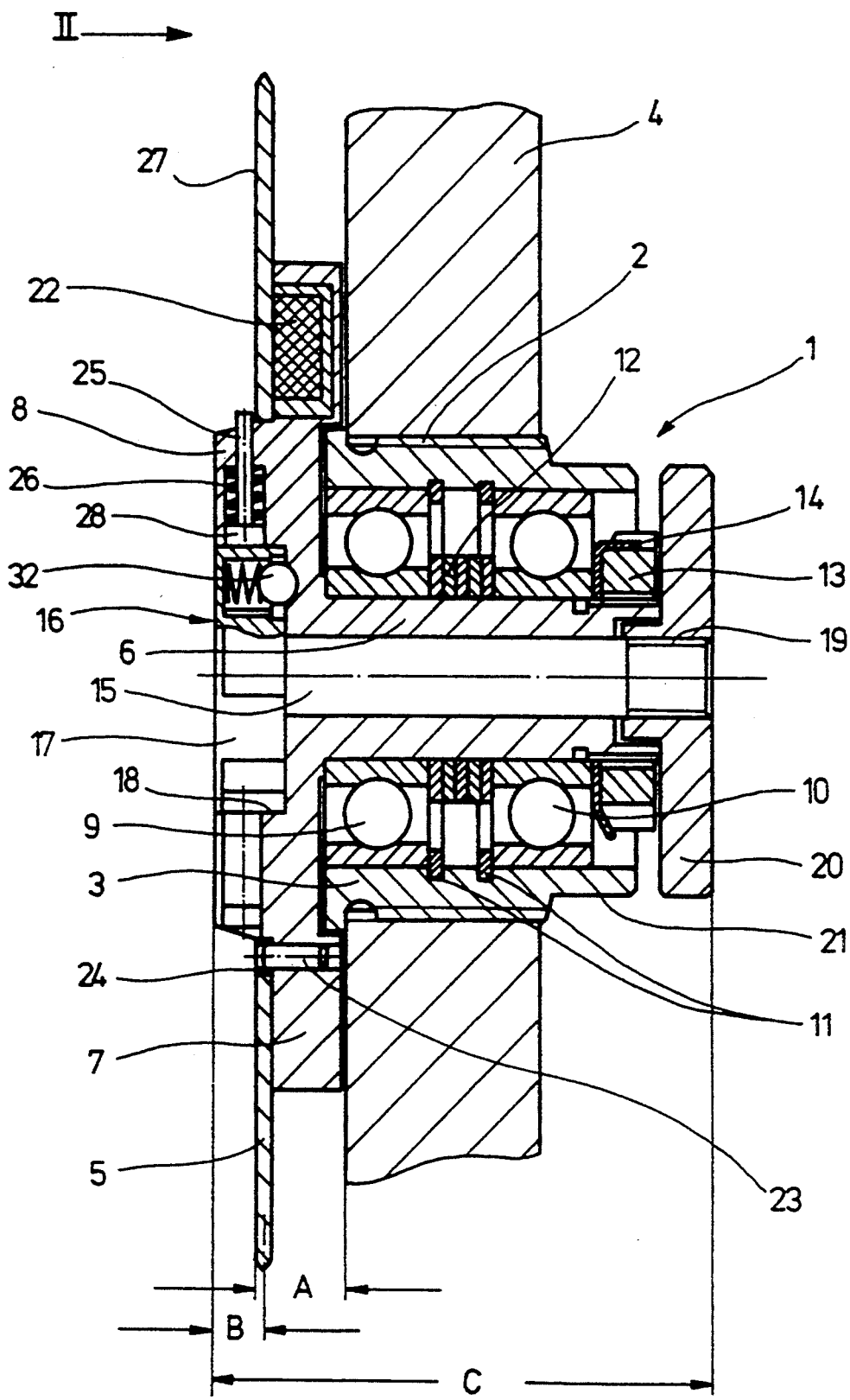
FIG. 1, a longitudinal section through the blade support device according to the invention, taken along the line I—I of FIG. 2.

In FIG. 1, a blade support device identified overall by reference numeral 1 is shown in longitudinal section; via a thread 2 that is provided on a threaded casing 3, it is screwed into a positioning arm 4. With the threaded casing 3, the spacing A of the cutting edge of a blade 5 from the positioning arm 4 can be set exactly. Rotating the threaded casing 3 inward or outward in the thread 2 of the positioning arm 4 is done via a knurled segment 21 of the threaded casing 3. A shaft 6 extends through this threaded casing 3; on one end, the shaft 6 has a bearing flange 7 and a mandrel 8 for the blade 5. Via two roller bearings 9 and 10, which are disposed in the threaded casing 3 via securing rings 11 and shims 12, the shaft 6 is rotatably supported in the casing. The shaft 6 is fixed via a shaft nut 13, which is secured against loosening via a securing plate 14.

As can be seen from FIG. 1, the shaft 6 is provided with a central bore, in which a further shaft 15 of a blade securing device, identified overall by reference numeral 16, is supported. The shaft 15 has a shaft segment of polygonal cross section on one end, which serves as the control unit 17. This control unit 17 is located in a recess 18 of the mandrel 8. The other end of the shaft 15 is provided with a thread 19, onto which a knurled disk 20 is screwed. Via the knurled disk 20, the shaft 15 and thus the control unit 17 can be rotated within the shaft 6 or mandrel 8.

To fix the blade 5 to the blade support device 1, the receiving flange 7 is provided with a total of three uniformly distributed permanent magnets 22, which hold the blade 5 tightly to the bearing flange 7. A cylindrical pin 23 is also let into the bearing flange 7, preventing rotation of the blade 5 on the bearing flange 7 about the mandrel 8. This cylindrical pin 23 protrudes beyond the surface of the bearing flange 7 and engages an opening 24 in the blade 5.

The mandrel 8 is provided with a total of three uniformly distributed securing pins 25, which are radially displaceably guided in radial bores of the mandrel 8. The radially inner end of each securing pin 25 is provided with a base 28, so that a compression spring 26 that forces the securing pin 25 radially inward can engage it. The bore receiving the securing pin 25 is disposed such that on one end the securing pin 25 engages the blade 5 from behind, and on the other it rests on the surface 27 of the blade 5 remote from the bearing flange 7. The base 28 of the securing pin 25 is forced by the compression spring 26 onto one corner 29, in the position of the control unit 17 shown in FIGS. 1 and 2. In this position, the opposite end of the securing pin 25 protrudes slightly beyond the circumference of the mandrel 8 and engages the blade 5 from behind, thereby securing it on the receiving flange 7.

If the control unit is rotated by 60° in one direction indicated by the double arrow 30 (FIG. 2) via the knurled disk, then the base 28 is located in a segment 31 between two corners 29 on the control unit 17 and is shifted radially inward. This radially inward shifting of the securing pin 25 retracts the securing pin 25 far enough into the mandrel 8 that it no longer engages the blade 5 from behind. It can now be removed from the bearing flange 7.

Figure 2:
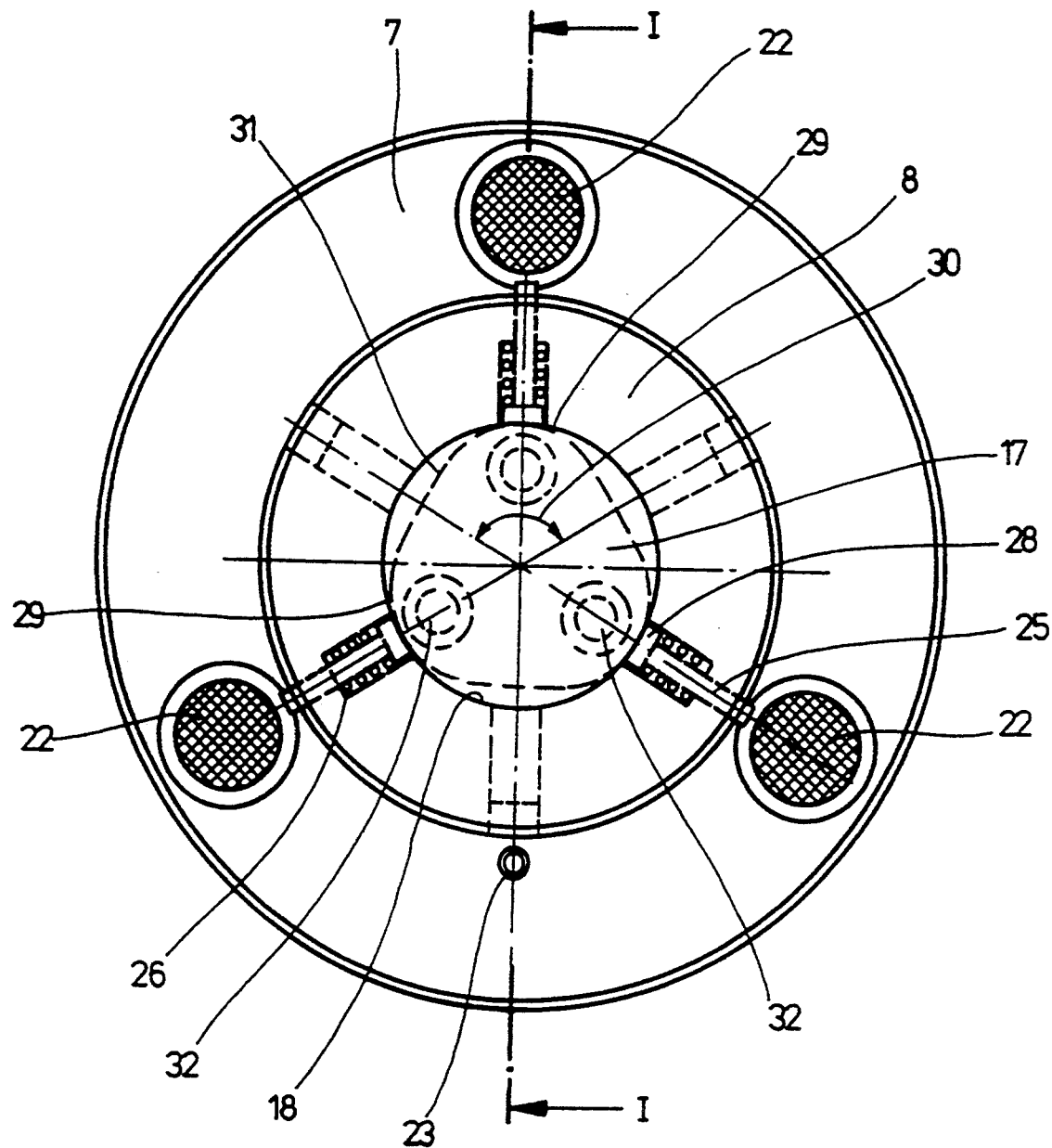
FIG. 2, a plan view on the blade support device of FIG. 1 in the direction of the arrow II with the blade removed.

The position of the control unit 17 shown in FIGS. 1 and 2, and the position rotated by 60°, are stabilized via a resilient thrust piece 32, which comprises a spring-loaded ball. This ball is forced via the spring into a recess, as shown in FIG. 1. A further recess is located at the same radial height but rotated by 60°.

It can be clearly seen in FIG. 1 that the height of the mandrel 8 is only slightly greater than the thickness of a securing pin 25. In this way, a relatively small spacing B between the outer end of the blade support device 1 and the cutting edge of the blade 5 is attained. It can also be seen that the total width C of the blade support device is likewise very slight, and amounts to 39 mm in the exemplary embodiment shown. In particular, no parts of the blade securing device 16 protrude beyond the outer edge of the blade support device 1 in the region of the blade 5.

Figure 3:
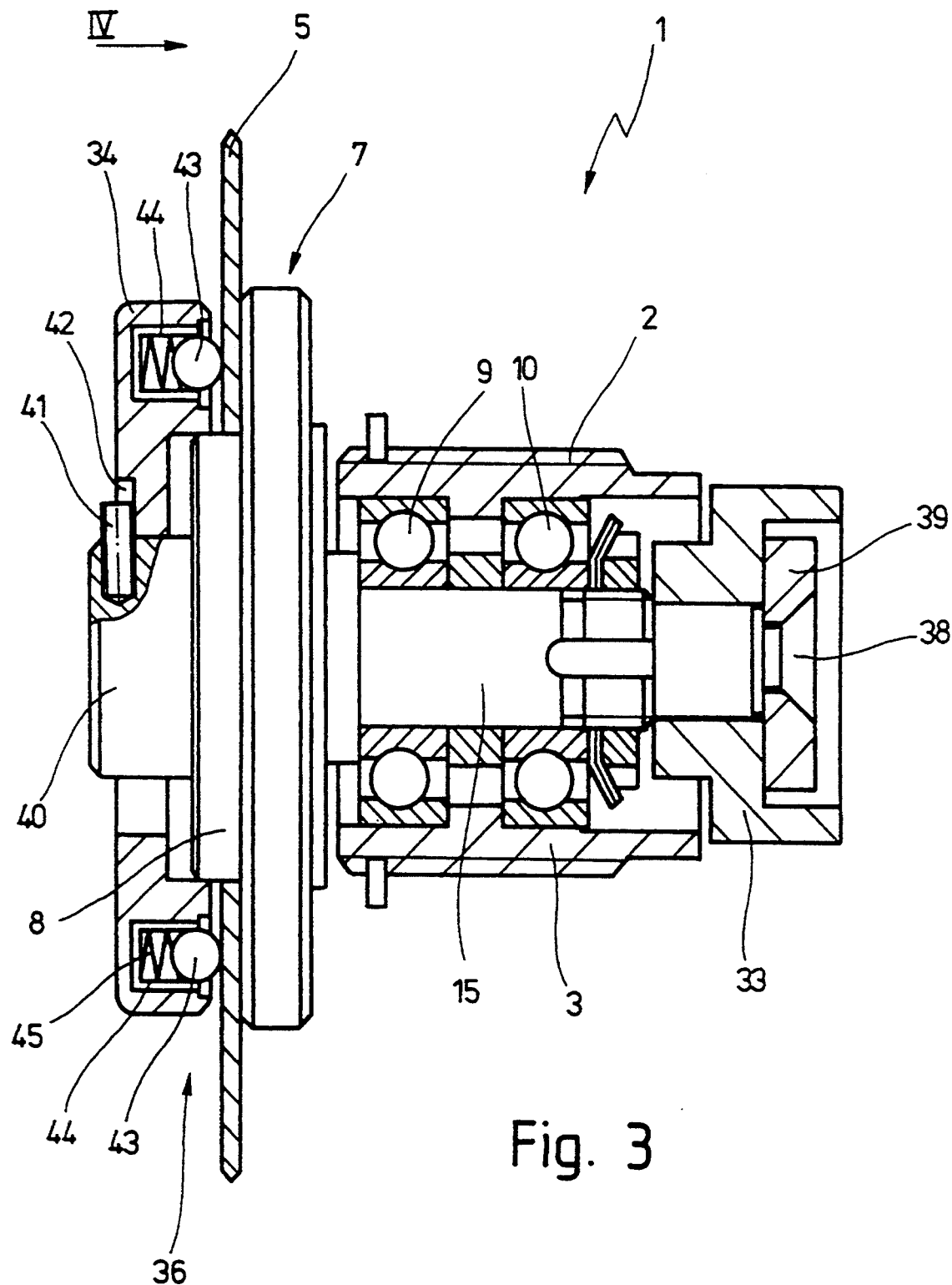
FIG. 3, a longitudinal section through an embodiment of a blade support device that has a bayonet mount.

FIG. 3 shows an exemplary embodiment of a blade support device 1 that has a bayonet mount 36. In this embodiment, the shaft 15 is supported in the threaded casing 3 via two roller bearings 9 and 10. The shaft 15 protrudes beyond the threaded casing 3 at both axial ends and has a brace 33 on one end that is axially screwed on via a screw 38 and a disk 39, and on its other end it has the bearing flange 7 for supporting the blade 5. The axial end 40 of the shaft 15 is provided with radially arranged bayonet pins 41, which protrude radially beyond the axial end 40. A bayonet plate 34 is also placed on the axial end 40 and is engaged from behind by the bayonet pins 41, which rest in indentations 42 of the bayonet plate 34. On the side toward the circular blade 5, the bayonet plate 34 has resiliently supported balls 43, which are supported in a bearing receptacle 44 and are secured against falling out and are acted upon by the pressure of a spring 45. Via these balls 43, the circular blade 5 is pressed against the bearing flange 7. Via the balls displaceably guided in the bearing receptacles 44, circular blades 5 of different thickness can advantageously be clamped. Centering of both the circular blade 5 and the bayonet plate 34 is done via the mandrel 8 of the bearing flange 7, via which both the circular blade 5 and the bayonet plate 34 are centered.

Figure 4:
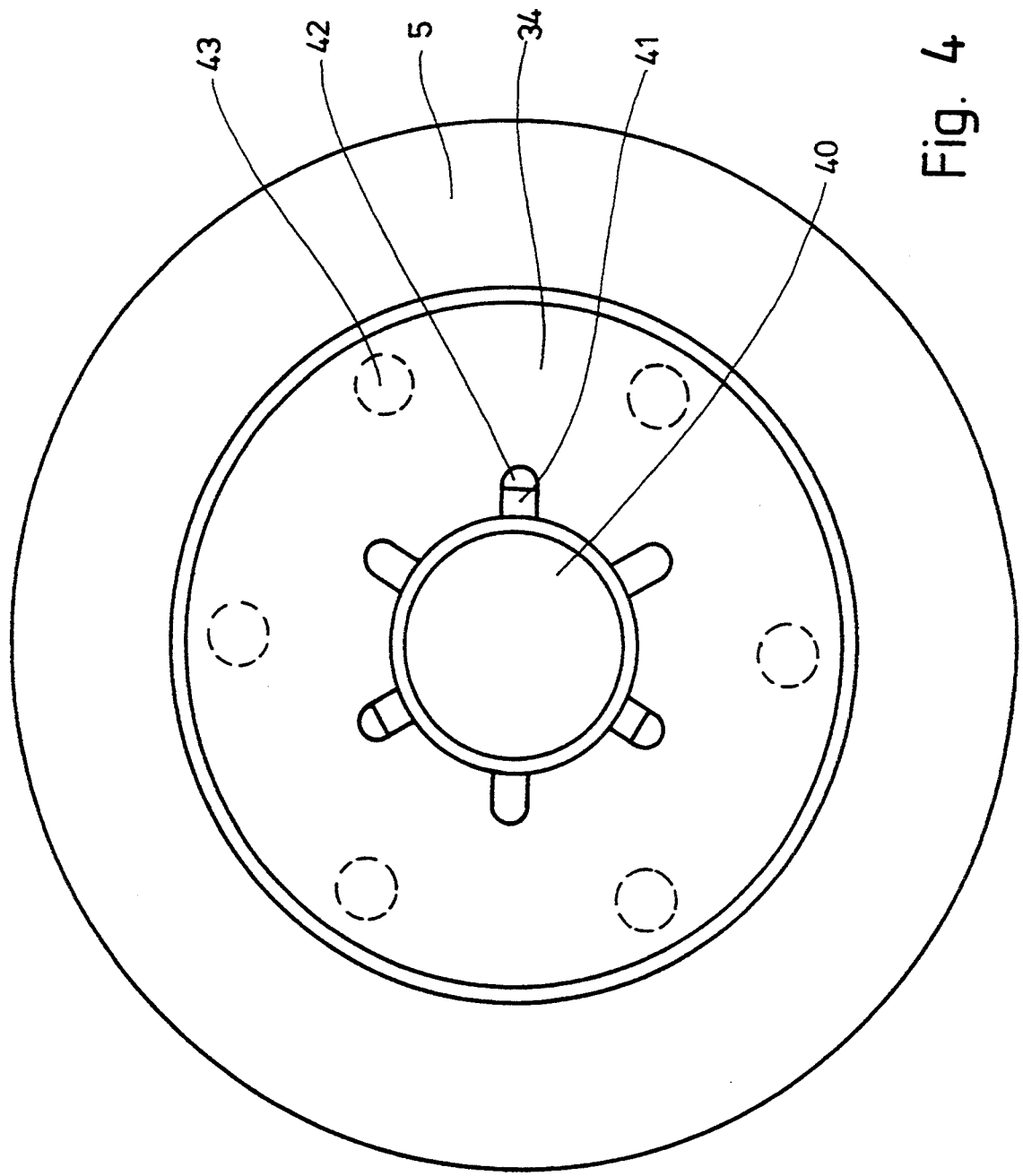
FIG. 4, a plan view on the blade support devices of FIG. 3 in the direction of the arrow IV.

FIG. 4 is a plan view on the bayonet plate 34 with the circular blade 5 located behind it, the balls 43 are suggested by dashed lines. The bayonet pins 41 located in the indentations 42 are clearly seen.

Figure 5:
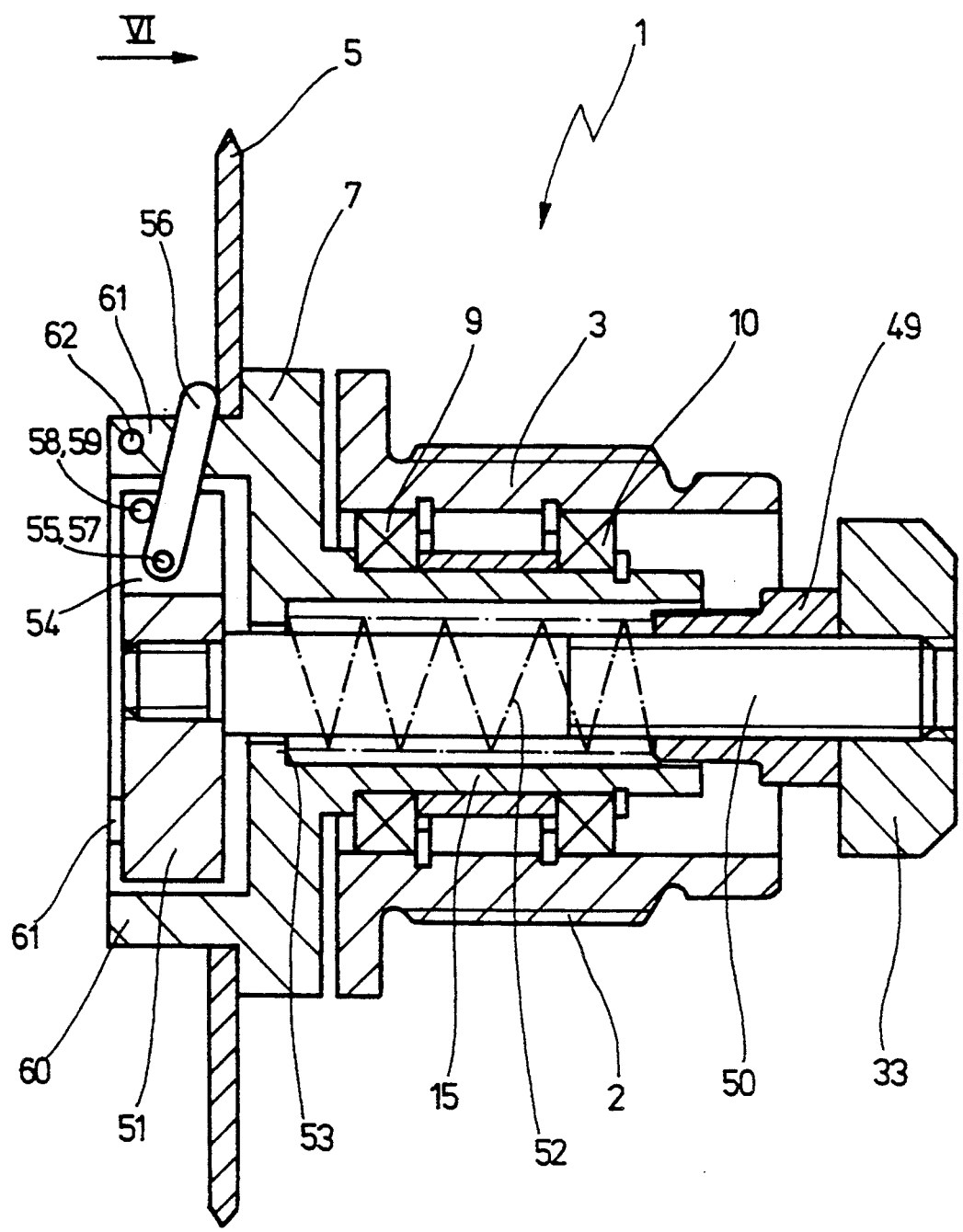
FIG. 5, a longitudinal section through a further embodiment of a blade support device having a clawed clamping unit.

In the exemplary embodiment of a blade support device 1 shown in FIG. 5, the threaded casing 3 likewise has a shaft 15 passing through it and engaging it. Once again, this shaft 15 is supported rotatably on the threaded casing 3 via two roller bearings 9 and 10. On the axial end opposite the circular blade 5, a brace 33 is provided. This brace 33 is axially displaceably supported via an extension piece 49 in the shaft 15, which is embodied as a hollow shaft, and reaches through the shaft via a tappet 50. On one end, this tappet 50 carries the brace 33, and on its other end it carries a grip head 51, via which the circular blade 5 is pressed against the bearing flange 7. Inside the shaft 15 embodied as a hollow shaft, a compression spring 52 is disposed around the tappet 50; one end of the spring rests on a radially inwardly pointing shoulder 53 of the hollow shaft 15, and its other end rests on the end of the extension piece 49 that engages the inside of the hollow shaft 15. Since the extension piece 49 is firmly joined to the tappet 50, for instance by a screw fastening, and the tappet 50 is axially displaceably supported in the shaft 15, the tappet 50 and with it the grip head 51 are forced to the right via the compression spring 52. Shifting of the tappet 50 in the other direction is done by manually pressing the brace 33 inward in the direction toward the threaded casing 3.

Figure 6:
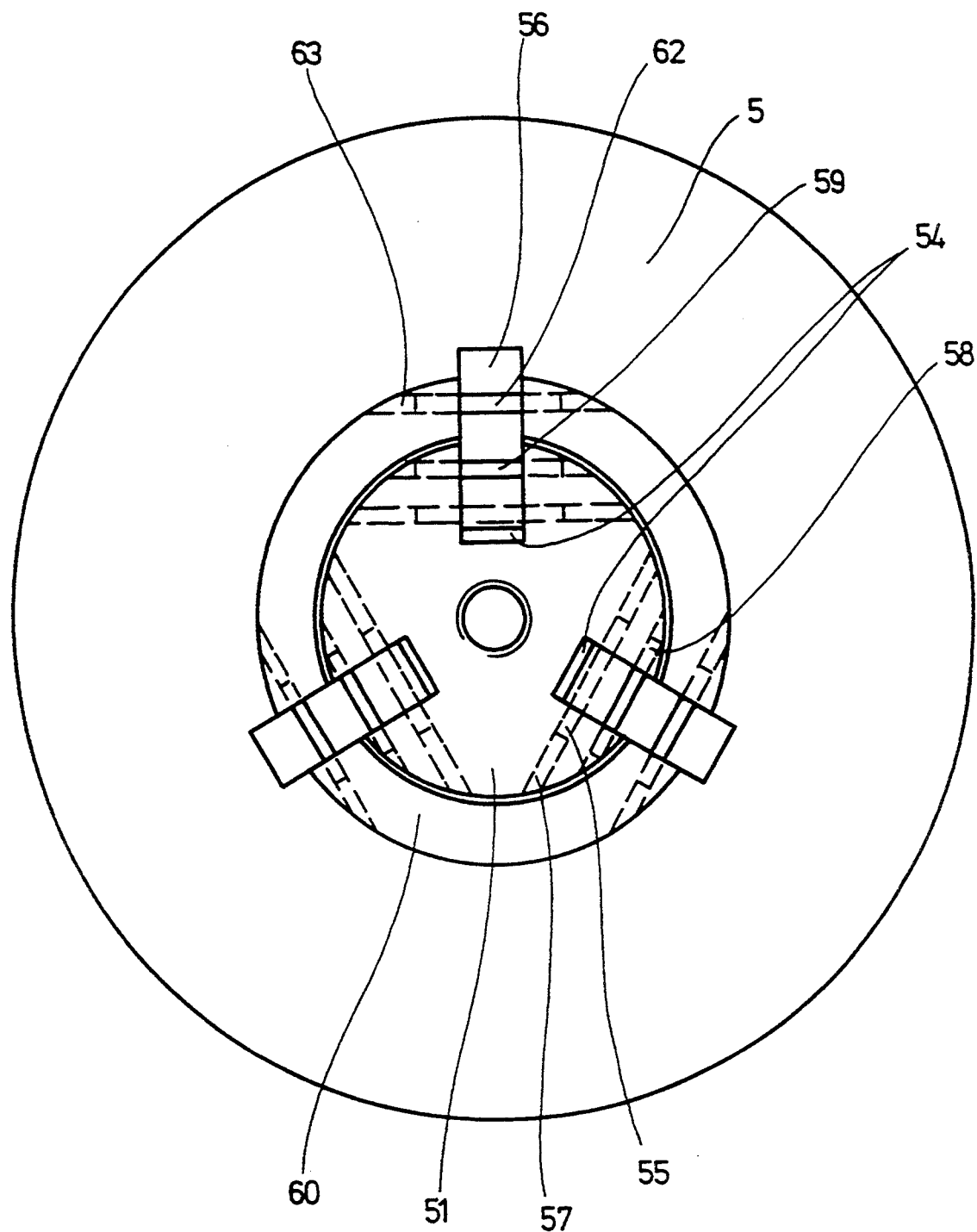
FIG. 6, a plan view on the blade support device of FIG. 5 in the direction of the arrow VI.
Figure 8:
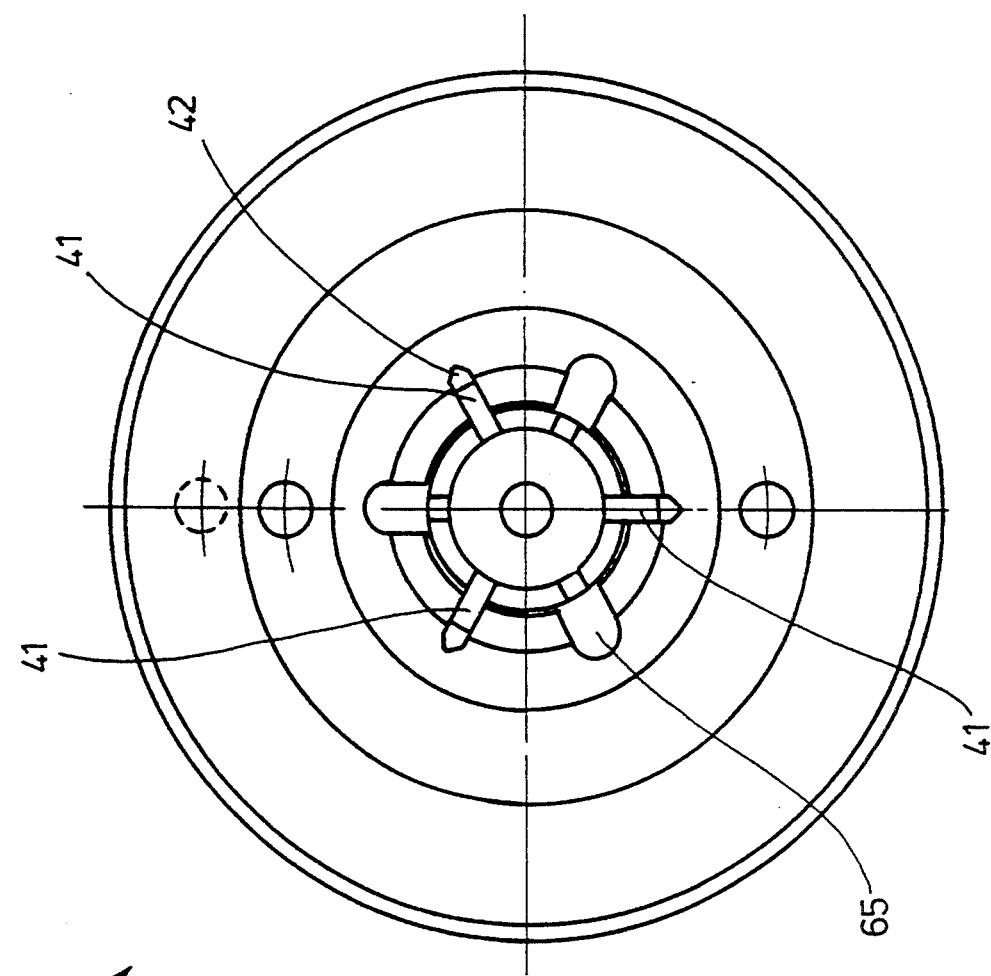
FIG. 8, a plan view on the blade support device of FIG. 7, in the direction of the arrow VIII.
Figure 7:
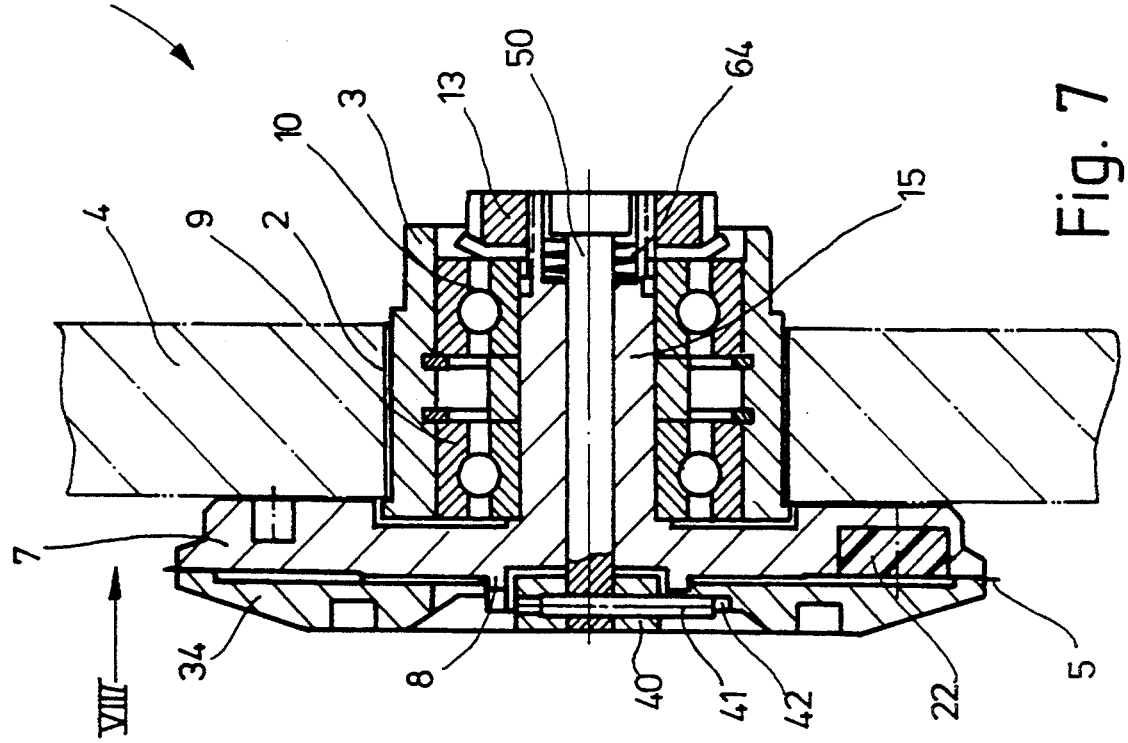
FIG. 7, a longitudinal section through a further embodiment of a blade support device.

As shown in FIG. 6, the grip head 51 has three recesses 54, which in the exemplary embodiment of FIGS. 7 and 8 are oriented radially outward. One claw 56 is pivotably supported in each of these recesses 54, via a bolt 55. As shown in FIG. 6, the bolt 55 is supported in a bore 57 provided in the grip head 51. This bore 57 is arranged such that it intersects the recess 54 in the radially inner region. A bore 58 that is axially parallel with the bore 57 is also provided and likewise intersects the recess 54. This bore 58 is located radially farther outward than the bore 57, as FIGS. 5 and 6 clearly show. FIG. 5 shows that the bore 58 is also axially farther outward than the bore 57. A bolt 59 is inserted into this bore 58 as well, overlapping the claw 56 in the crosswise direction. The bolt 59 serves as a brace for the claw 56 that rests on the circular blade 5 and is supported on the bolt 59. Via the bolt 59, the claw 56 is prevented from pivoting clockwise about the bolt 55 (FIG. 5). The length of the claw 56 is selected such that it protrudes radially beyond the grip head 51 and via a recess 61 reaches through an annular extension 60 that receives the grip head 51 and is embodied as part of the receiving flange 32. This recess 61 is closed in the axial direction by a third bolt 62, which is inserted into a bore 63 that is axially parallel to the bores 57 and 58. Accordingly, the claw 56 can move inside the recess 61 between its bottom and the bolt 62.

If the tappet 50 is now displaced axially to the left inside the shaft 15, by pressing the brace 33 inward in the direction of the threaded casing 3, then the grip head 51 shifts relative to the annular extension 60 of the bearing flange 7. In the process, the claw 56 lifts from the surface of the circular blade 5, because it is likewise moved to the left with the grip head 51. After a certain travel distance, the claw 56 strikes the bolt 62, and upon further displacement of the grip head 51 to the left is gradually rotated clockwise about the bolt 55. In the process, the claw 56 is gradually retracted into the recess 61. This continues until the claw 56 no longer radially protrudes beyond the annular extension 60. The circular blade 5 can now be slipped across the annular extension 60 and exchanged for a new one. This new circular blade 5 is slipped on to the annular extension 60 until its rests on the stop flange 7, as shown in FIG. 5. Then the pressure on the brace 33 is reduced, so that the compression spring 52 moves the tappet 50 to the right. As a result, the grip head 51 and with it the claw 56 are likewise moved to the right. After a certain travel distance, the claw 56 rests on the bottom of the recess 61 and is then pivoted counterclockwise about the bolt 55. In this process, it gradually emerges from the recess 61 and protrudes beyond the annular extension 60. The claw 56 then rests on the surface of the circular blade 5. This counterclockwise pivoting motion about the bolt 55 continues until the bolt 58 rests on the claw 56 and presses the claw with the force of the compression spring 52 against the surface of the circular blade 5. In this way, the circular blade 5 is held securely and without play on the bearing flange 7 via the three claws 56. Because of the movable disposition of the claws 56 on the grip head 51, it is also possible to clamp circular blades 5 of various thicknesses. This embodiment of a blade support device 1 has the substantial advantage that it need not be broken down into individual parts in order for the blade to be changed.

With the blade support devices 1 according to the invention, circular blades 5 having an inside diameter of from 15 mm to 100 mm can be clamped. Moreover, circular blades 5 having a blade thickness of from 1 mm to 5 mm can be mounted.

In the exemplary embodiment shown in FIGS. 7 and 8, the mandrel 8 extends through the blade 5, which rests on the bearing flange 7. There the blade is held by three permanent magnets 22 distributed uniformly over the circumference. Securing of the blade is done via the bayonet plate 34, which is held by radially arranged bayonet pins 41. These bayonet pins 41 are located on one axial end 40 of the tappet 50, which extends axially through the shaft 15. The tappet 50, which for instance is a retaining bolt screwed into the axial end 40, is loaded via a plurality of cup springs 64 such that via the bayonet pins 41, it forces the bayonet plate 34 toward the blade 5 and the bearing flange 7. In this way, the blade 5 is securely held on the bearing flange 7. For loosening the blade 5, the tappet 50 is pressed inward on its right-hand end into the shaft 15, counter to the force of the cup springs 64, so that the bayonet pins 41 are lifted out of the indentations 42. By rotating the bayonet plate 34, the bayonet pins 41 can be moved into the region of openings 65, so that the bayonet plate 34 can be pulled off. This blade support device 1 has the substantial advantage that with it, extremely thin blades 5 having a thickness of from 0.05 to 0.5 mm can be clamped.

What is claimed is:

1. A blade support, comprising:
   a positioning arm; and
   a blade support device mounted to the positioning arm for rotatably supporting a blade, said blade support device having a mandrel on which the blade is centered, a bearing flange against which the blade is supported, securing means which engage the blade and maintain it mounted to said mandrel against axial movement relative to said positioning arm and a quick-action lock connected to said securing means for releasing the blade from its engagement and maintenance with said securing means, wherein said quick-action lock comprises a shaft, a tappet axially displaceable in said shaft and a bayonet mount which presses the blade against a bed of the blade support device, said bayonet mount including a bayonet plate and a plurality of bayonet pins which engage the bayonet plate on its side opposite to that which engages the blade.

2. The blade support as defined in claim 1, wherein the tappet is forced via at least one spring into a position of repose.

3. The blade support as defined in claim 2, wherein said at least one spring is a cup spring.

4. A blade support, comprising:
   a positioning arm; and
   a blade support device mounted to the positioning arm for rotatably supporting a blade, said blade support device having a mandrel on which the blade is centered, a bearing flange against which the blade is supported, securing means which engage the blade and maintain it mounted to said mandrel against axial movement relative to said positioning arm and a quick-action lock connected to said securing means for releasing the blade from its engagement and maintenance with said securing means, wherein said quick-action lock comprises a clawed clamping unit having retractable and extensible claws that press the blade against a bed of the blade support device, said clamping unit being actuatable without tools, and wherein said clawed clamping unit includes a coaxial tappet and spring means for biasing the tappet in the axial direction, said tappet having a grip head which includes claws extending beyond the outer circumference of the grip head said claws fixing the blade in a bed of the blade support device via the force of the spring-loaded tappet.

5. The blade support as defined in claim 4, wherein the claws are retracted inside of the outer circumference of the grip head by axial displacement of said tappet.

6. A blade support, comprising:
   a positioning arm; and
   a blade support device mounted to the positioning arm for rotatably supporting a blade, said blade support device having a mandrel on which the blade is centered, a bearing flange against which the blade is supported, securing means which engage the blade and maintain it mounted to said mandrel against axial movement relative to said positioning arm and a quick-action lock connected to said securing means for releasing the blade from its engagement and maintenance with said securing means, wherein said securing means includes a blade securing device and blade engaging elements, said mandrel defines a central recess surrounded by said blade engaging elements, and said blade securing device being rotatably mounted in said recess such that it engages said blade engaging elements, and wherein said blade securing device comprises a shaft having a polygonal cross section with each corner of the polygon associated with a respective blade engaging element.

7. The blade support as defined in claim 6, wherein said blade engaging elements comprise radially displaceable pins.

8. A blade support, comprising:
   a positioning arm; and
   a blade support device mounted to the positioning arm for rotatably supporting a blade, said blade support device having a mandrel on which the blade is centered, a bearing flange against which the blade is supported, securing means which engage the blade and maintain it mounted to said mandrel against axial movement relative to said positioning arm and a quick-action lock connected to said securing means for releasing the blade from its engagement and maintenance with said securing means, wherein said securing means include radially displaceable pins mounted to said mandrel which engage the blade and secure it against shifting axially from the bearing flange.

* * * * *